United States Patent [19]

Zirngibl

[11] Patent Number: 5,745,616
[45] Date of Patent: Apr. 28, 1998

[54] WAVEGUIDE GRATING ROUTER AND METHOD OF MAKING SAME HAVING RELATIVELY SMALL DIMENSIONS

[75] Inventor: Martin Zirngibl, Middletown, N.J.

[73] Assignee: Lucent Technologies Inc., Murray Hill, N.J.

[21] Appl. No.: 758,623

[22] Filed: Nov. 27, 1996

[51] Int. Cl.⁶ .................. G02B 6/34; H04J 14/02
[52] U.S. Cl. .................. 385/37; 385/14; 385/15; 385/17; 385/18; 385/39; 385/46; 385/47; 359/115; 359/124; 359/127; 359/130
[58] Field of Search .................. 385/14, 15, 16, 385/17, 18, 24, 31, 37, 39, 42, 46, 47, 49, 129, 132; 359/115, 124, 127, 130

[56] References Cited

U.S. PATENT DOCUMENTS

| | | | |
|---|---|---|---|
| 5,002,350 | 3/1991 | Dragone | 385/37 X |
| 5,136,671 | 8/1992 | Dragone | 385/46 |
| 5,179,605 | 1/1993 | Kaverhad et al. | 385/37 |
| 5,206,920 | 4/1993 | Cremer et al. | 385/37 |
| 5,243,672 | 9/1993 | Dragone | 385/46 |
| 5,339,157 | 8/1994 | Glance et al. | 385/24 |
| 5,367,586 | 11/1994 | Glance et al. | 385/24 |
| 5,373,516 | 12/1994 | Glance et al. | 372/20 |
| 5,412,744 | 5/1995 | Dragone | 385/24 |
| 5,440,416 | 8/1995 | Cohen et al. | 359/127 |
| 5,461,685 | 10/1995 | Glance et al. | 385/24 |
| 5,467,418 | 11/1995 | Dragone | 385/37 |
| 5,488,680 | 1/1996 | Dragone | 385/24 |
| 5,515,460 | 5/1996 | Stone | 385/24 |
| 5,542,010 | 7/1996 | Glance et al. | 385/14 |
| 5,600,742 | 2/1997 | Zirngibl | 385/37 |

OTHER PUBLICATIONS

"Demonstration of a 15×15 Arrayed Waveguide Multiplexer on InP," M. Zirngibl et al., IEEE Photonics Technology Letters, Vol. 4, Nov. 1992, pp. 1250–1252.

"Small–Size, Polarisation–Independent Phrased–Array Demultiplexers on InP," H. Bissessur et al., Electronics Letters, Vol. 31, 1995, pp. 2118–2119.

Primary Examiner—Brian Healy
Attorney, Agent, or Firm—Steven R. Bartholomew

[57] ABSTRACT

A compact waveguide grating router is constructed by forming at least first and second free space regions, first and second sets of optical ports, and a grating array, onto a substrate. The grating array is coupled to the first free space region and the second free space region. A first plane defining a first reflective surface is introduced into the first free space region, and a second plane defining a second reflective surface is introduced into the second free space region. The first plane is oriented such that incident optical signals from the first set of optical ports are reflected to the grating array, and the second plane is oriented such that incident optical signals from the grating array are reflected to the second set of optical ports. The first and second planes are provided, for example, by cleaving, cutting, etching, sawing, or any other suitable technique. The first and second planes enable the input and output ports to be folded back into previously unoccupied space. The aforementioned techniques enable the size of any conventional waveguide grating router to be substantially reduced.

24 Claims, 4 Drawing Sheets

WAVEGUIDE GRATING ROUTER AND METHOD OF MAKING SAME HAVING RELATIVELY SMALL DIMENSIONS

BACKGROUND OF THE INVENTION

1. Field of the Invention

The present invention relates generally to fiber optic communications networks, and, more particularly, to communications networks that include passive components for routing and distributing optical signals of different wavelengths.

2. Related Art

Waveguide grating routers are typically utilized in the context of optical wavelength division multiplexing (WDM). Numerous applications, far beyond simultaneously multiplexing and demultiplexing received optical signals, have been provided by monolithically integrating these routers with optical lasers, receivers, and switches. Unfortunately, the large size of conventional waveguide grating router structures has placed severe limitations on the number of useful devices that may be fabricated onto a single substrate. Moreover, the performance of existing waveguide grating router configurations is typically degraded due to variations in the spatial refractive index across the semiconductor wafer. Such variations are generally attributable to crystallographic growth and processing non-uniformities.

One illustrative example of a prior art waveguide multiplexer/demultiplexer is shown in FIG. 1. FIG. 1 is a schematic drawing of a conventional waveguide multiplexer/demultiplexer (MUX/DEMUX) 10 comprising a set of N input ports indicated generally at 12, a first free space region 14, a waveguide grating array 16, a second free space region 18, and a set of N output ports 20.

The fabrication of MUX/DEMUX structures such as the one depicted in FIG. 1 is shown and described in a paper by Martin Zirngibl et al. entitled "Demonstration of a 15×15 Arrayed Waveguide Multiplexer on InP", IEEE Photonics Technology Letters, Vol. 4, November, 1992, pp. 1250–1252. The structure shown in FIG. 1 can be fabricated on a two-inch wafer of InP having a thickness of approximately 600 μm by epitaxially growing a 0.4 μm thick, graded-index quaternary waveguide layer finished by an 0.04 μm rib layer. The device may be photolithographically defined, and the rib layer etched, to form the input ports, free space regions, grating array, and output ports, thereby providing the arrangement illustrated in FIG. 1. Finally, the structure may be covered with epitaxial growth, using an InP cladding layer of approximately 2 μm.

In operation, light emanating from one of the input ports 12 into the free space region 14 is collected by the dispersive waveguide grating arms of array 16. As will be readily ascertained by those skilled in the art, a constant path length difference between adjacent grating arms causes a wavelength dependent phase shift. This linear phase progression affects the propagation direction of the converging wave radiated in the second free space region 18 toward the output ports 20.

As can be seen in FIG. 1, there is a substantial amount of unused space enclosed by the waveguide grating array 16 and free space regions 14 and 18. Accordingly, various approaches have been advanced to reduce the size of waveguide grating routers. For example, in the case of InP waveguide grating routers, prior art approaches have focused on size reduction by employing high contrast waveguides to enable a tight bend radius of curvature. However, the bend radius is not the only parameter that determines the size of the waveguide grating router. For example, there are two free-space regions in the waveguide grating router that must be of sufficient length so as to allow the light to be spread sufficiently, thereby permitting the light to be captured by the waveguides of the dispersive waveguide grating.

Although various approaches have been advanced in the prior art to provide waveguide grating routers having small dimensions, any benefits obtained by smaller size are offset by either a significant deterioration in device performance, or by such stringent processing tolerances so as to render their use economically unfeasible. By way of illustration, in an article by H. Bissessur et al. entitled "Small-Size, Polarisation-Independent Phased-Array Demultiplexers on InP", Electronics Letters, vol. 31, pp. 2118–2119, (1995), there is described a compact demultiplexing and multiplexing device in which a highly confined waveguide structure is utilized. In this device, a high refractive index differential is realized by forming semiconductor-to-air interfaces. As will be readily appreciated by those skilled in the art, such a device can only be obtained by rigidly controlling tolerances during the fabrication process. Because of this, consistently adequate yields, as would be required for the production of commercial quantities of the device, are difficult to achieve. What is needed is a waveguide grating router of smaller size than that provided by prior art designs and which minimizes and/or eliminates the shortcomings of prior art designs.

SUMMARY OF THE INVENTION

A compact waveguide grating router is constructed by forming at least first and second free space regions, first and second sets of optical ports, and a grating array, onto a substrate. The grating array is coupled to the first free space region and the second free space region. A first plane defining a first reflective surface is introduced into the first free space region, and a second plane defining a second reflective surface is introduced into the second free space region. The first plane is oriented such that incident optical signals from the first set of optical ports are reflected to the grating array, and the second plane is oriented such that incident optical signals from the grating array are reflected to the second set of optical ports. The first and second planes are provided, for example, by cleaving, cutting, etching, sawing, or any other suitable technique. The first and second planes enable the input and output ports to be folded back into previously unoccupied space. The aforementioned techniques enable the size of any conventional waveguide grating router to be substantially reduced.

According to a further embodiment, a third plane is oriented in a direction such that this plane passes through both the first free space region and the second free space region, and such that the third plane is substantially perpendicular to the first and second planes. The third plane defines an optically-reflective surface and may be introduced, for example, by cleaving, cutting, etching, sawing, or any other suitable technique.

An alternate embodiment provides a compact waveguide grating router by forming a first free space region, a first set of optical ports, and a grating array, onto a substrate. The grating array is coupled to the first free space region. A first plane defining a first reflective surface is introduced into the first free space region. The first plane is oriented such that incident optical signals from the first set of optical ports are reflected to the grating array. A second plane defining a second optically reflective surface is oriented in a direction such that this plane passes through the first free space region, and such that the second plane is substantially perpendicular to the first plane. A third plane defines a third optically reflective surface, and is oriented across the waveguide grating in a direction substantially perpendicular to the direction in which optical energy traverses the waveguide grating. The first, second, and third planes are provided, for example, by cleaving, cutting, etching, sawing, or any other suitable technique. The first, second, and third planes enable the input and output ports to be folded back into previously unoccupied space, thereby providing a waveguide grating router of relatively compact dimensions.

BRIEF DESCRIPTION OF THE DRAWINGS

Other advantages and features of the invention will be readily apparent from the following description and to the accompanying drawings, in which.

DETAILED DESCRIPTION OF THE INVENTION

Figure 1:
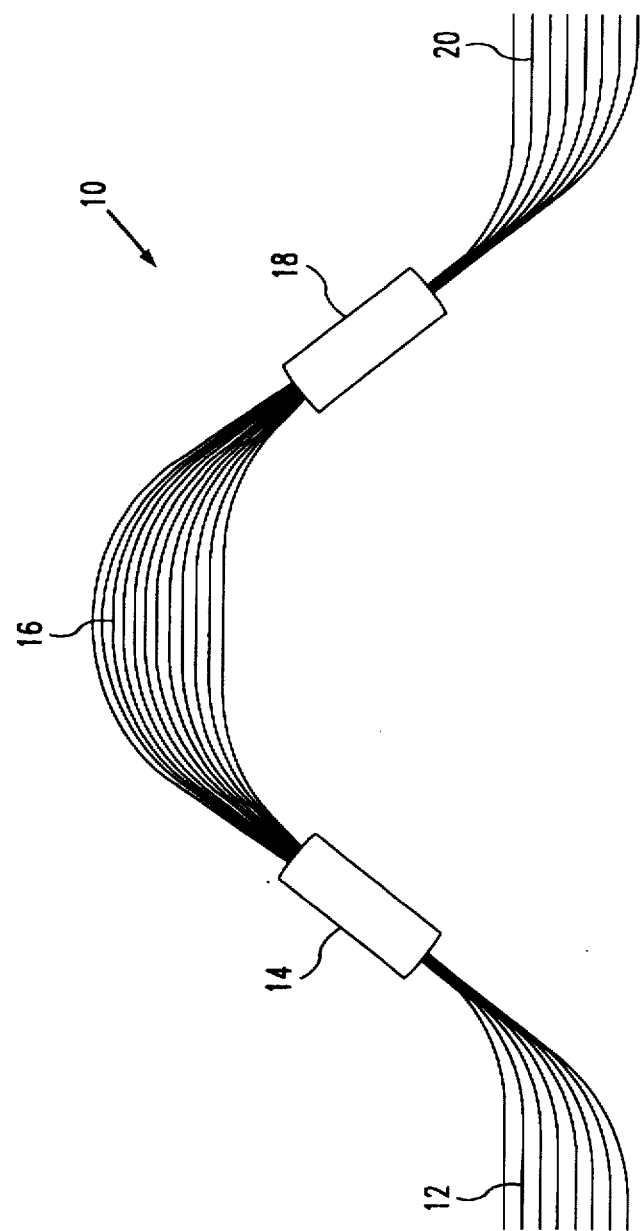
FIG. 1 is a schematic drawing of a prior-art waveguide grating router.
Figure 2:
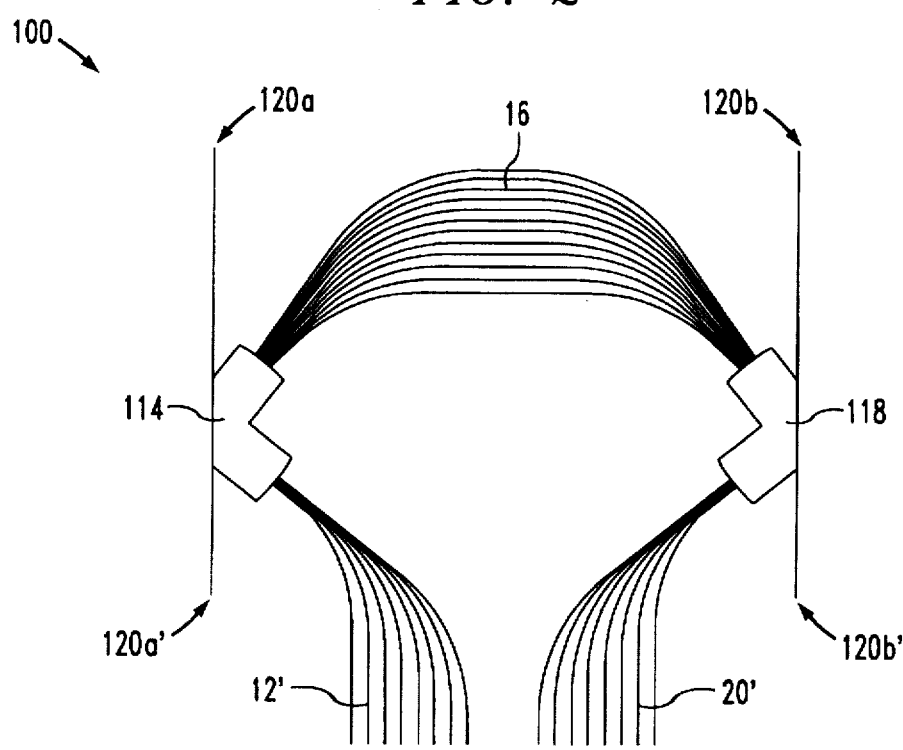
FIG. 2 is a schematic drawing of a waveguide grating router constructed according to a first embodiment and employing first and second optically reflective planes.

FIG. 2 is a schematic drawing of a waveguide grating router 100 constructed according to a first embodiment. Waveguide grating router 100 may depict, for example, an N by N multiplexer/demultiplexer structure that is constructed in roughly the same manner as the structure 10 depicted in FIG. 1, but with two notable structural differences: the use of a first plane 120a–120a', and a second plane 120b–120b'. Although the structure of FIG. 2 is shown with first plane 120a–120a' and second plane 120b–120b', this is for purposes of illustration. The structure of FIG. 2 may, alternatively, be fabricated using first plane 120a–120a' without using second plane 120b–120b'. Still alternatively, the structure of FIG. 2 may be fabricated using second plane 120b–120b' without using first plane 120a–120a'.

Referring now to FIG. 2, a compact waveguide grating router 100 is constructed by forming at least a first free space region 114, a second free space region 118, a first set of optical ports 12', a second set of optical ports 20', and a grating array 16, onto a substrate. The grating array 16 is coupled to the first free space region 114 and the second free space region 118. A first plane 120a–120a' defining a first reflective surface is introduced into the first free space region 114, and a second plane 120b–120b' defining a second reflective surface is introduced into the second free space region 118.

The first plane 120a–120a' is oriented such that incident optical signals from the first set of optical ports 12' are reflected to the grating array 16, and the second plane 120b–120b' is oriented such that incident optical signals from the grating array 16 are reflected to the second set of optical ports 20'. The first and second planes 120a–120a', 120b–120b' are provided, for example, by cleaving, cutting, etching, sawing, or any other suitable technique. The first and second planes 120a–120a', 120b–120b' enable the input and output ports to be folded back into previously unoccupied space. As will be immediately recognized by those skilled in the art, the aforementioned techniques enable the size of any conventional waveguide grating router to be reduced substantially.

Figure 3:
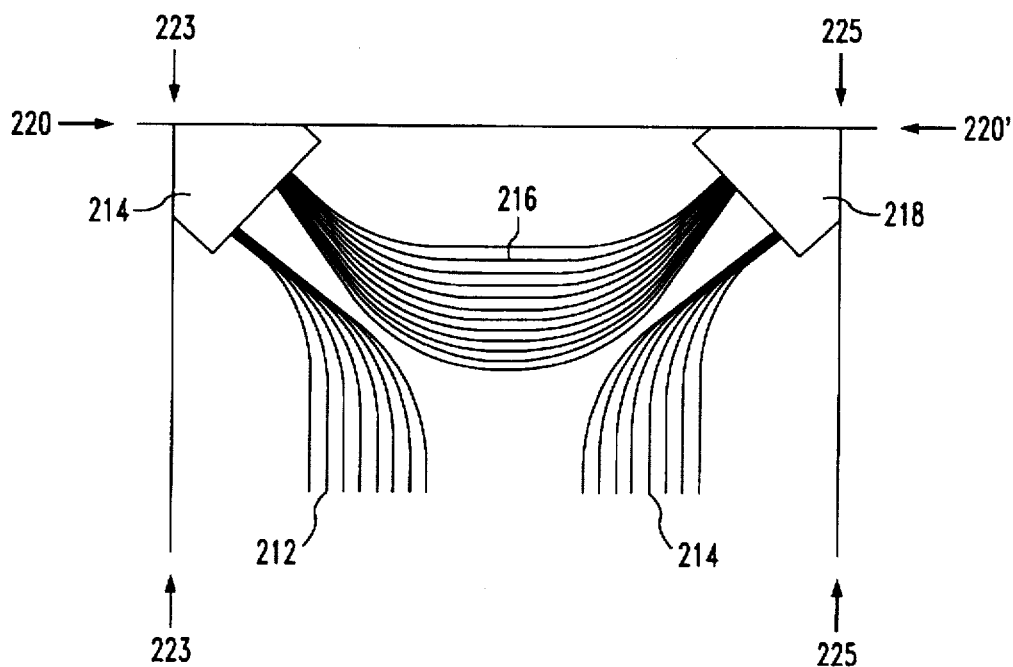
FIG. 3 is a schematic drawing of a waveguide grating router constructed according to a second embodiment and employing first, second, and third optically reflective planes.

FIG. 3 is a schematic drawing of a waveguide grating router 200 constructed according to a second embodiment and employing first, second, and third optically reflective planes 223–223', 225–225', and 220–220', respectively. With reference to FIG. 3, compact waveguide grating router 200 is constructed by forming at least a first free space region 214, a second free space region 218, a first set of optical ports 212, a second set of optical, ports 214, and a grating array 216, onto a substrate. The grating array 216 is coupled to the first free space region 214 and the second free space region 218. A first plane 223–223', defining a first optically reflective surface, is introduced into the first free space region 214, and a second plane 225–225' defining a second reflective surface is introduced into the second free space region 218.

A third plane 220–220', defining a third optically reflective surface, is oriented in a direction such that this plane passes through both the first free space region 214 and the second free space region 218, and such that the third plane 220–220' is substantially perpendicular to the first and second planes 223–223' and 225–225', respectively. The first plane 223–223' and third plane 220–220' are oriented such that incident optical signals from the first set of optical ports 212 are reflected to the grating array 216, and the second plane 225–225' and third plane 220–220' are oriented such that incident optical signals from the grating array 216 are reflected to the second set of optical ports 214.

The first, second, and third planes 223–223', 225–225', 220–220', respectively, are provided, for example, by cleaving, cutting, etching, sawing, or any other suitable technique. These planes 223–223', 225–225', 220–220' enable input and output ports 212, 214 and grating array 216 to be folded back into previously unoccupied space. As will be immediately recognized by those skilled in the art, the aforementioned techniques enable the size of any conventional waveguide grating router to be reduced substantially.

Figure 4:
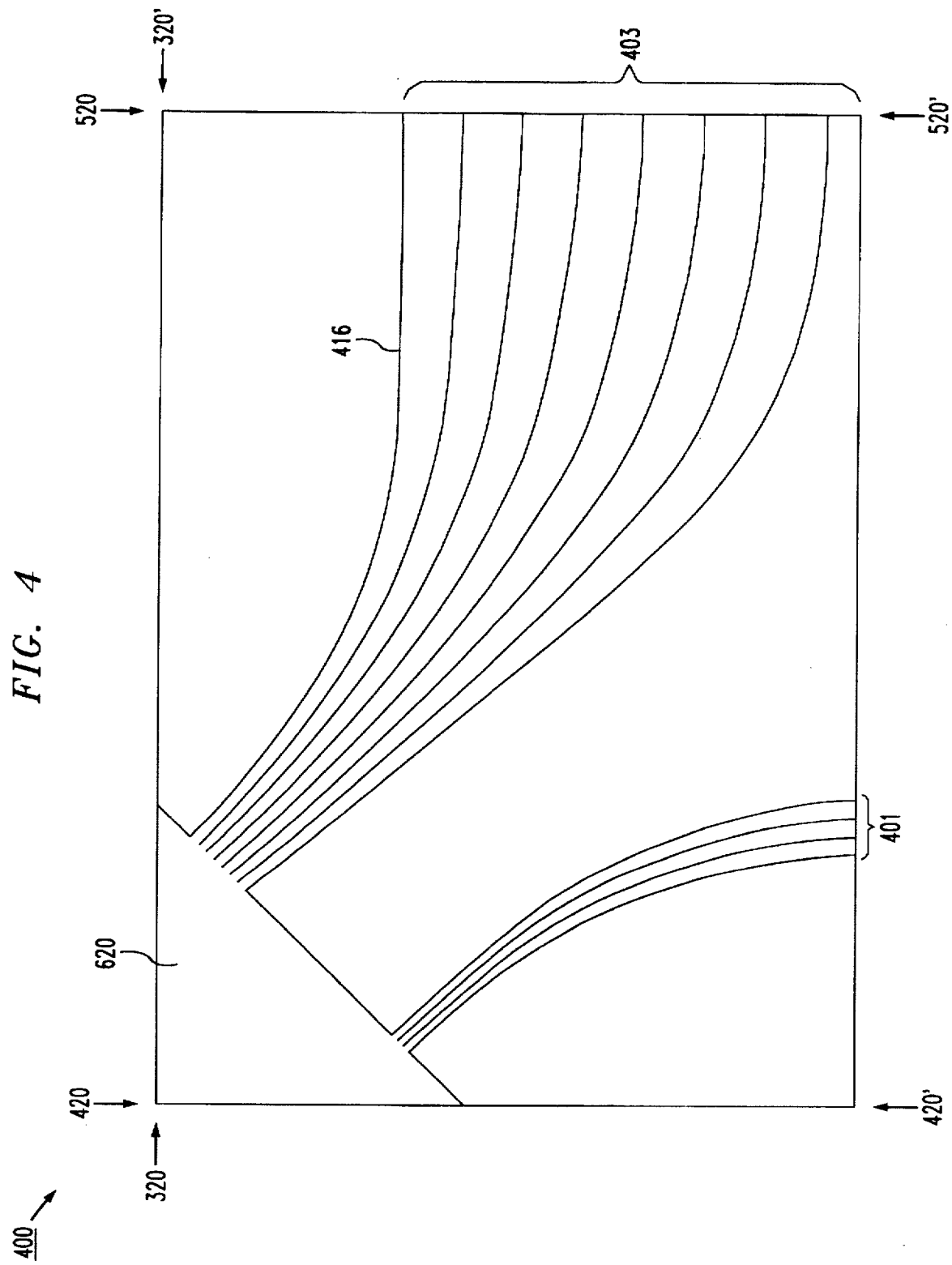
FIG. 4 is a schematic drawing of a waveguide grating router constructed according to a third embodiment and employing first, second, and third optically reflective planes.

FIG. 4 is a schematic drawing of a waveguide grating router 400 constructed according to a third embodiment and employing first, second, and third optically reflective planes 320–320', 420–420', 520–520', respectively. Referring to FIG. 4, compact waveguide grating router 400 is constructed by forming a first free space region 620, a first set of optical ports 401, and a grating array 416, onto a substrate. The grating array 416 is coupled to the first free space region 620. A first plane 320–320', defining a first optically reflective surface, is introduced into the first free space region 620, and a second plane 420–420' defining a second reflective surface is introduced into the second free space region 620. The first plane 320–320' is substantially perpendicular to the second plane 420–420'. A third plane 520–520', defining a third optically reflective surface, is oriented in a direction such that this plane is substantially parallel to the second plane 420–420'.

The first plane 320–320' and the second plane 420–420' are oriented such that incident optical signals from the first set of optical ports 401 are reflected to the first grating array 416. The third plane 520–520' is oriented across the waveguide grating in a direction substantially perpendicular to the direction in which optical energy traverses the waveguide grating 416, thereby reflecting incident optical energy received from the waveguide grating 416 back into the grating. The first, second, and third planes 320–320', 420–420', and 520–520' are provided, for example, by cleaving, cutting, etching, sawing, or any other suitable technique. The first, second, and third planes enable the input and output ports 212, 214 of FIG. 3 to be folded back into previously unoccupied space, and to be folded together into a single set of optical ports 401 (FIG. 4). The design of FIG. 4 also permits the waveguide grating 416 to be placed within previously unoccupied space.

Figure 5:
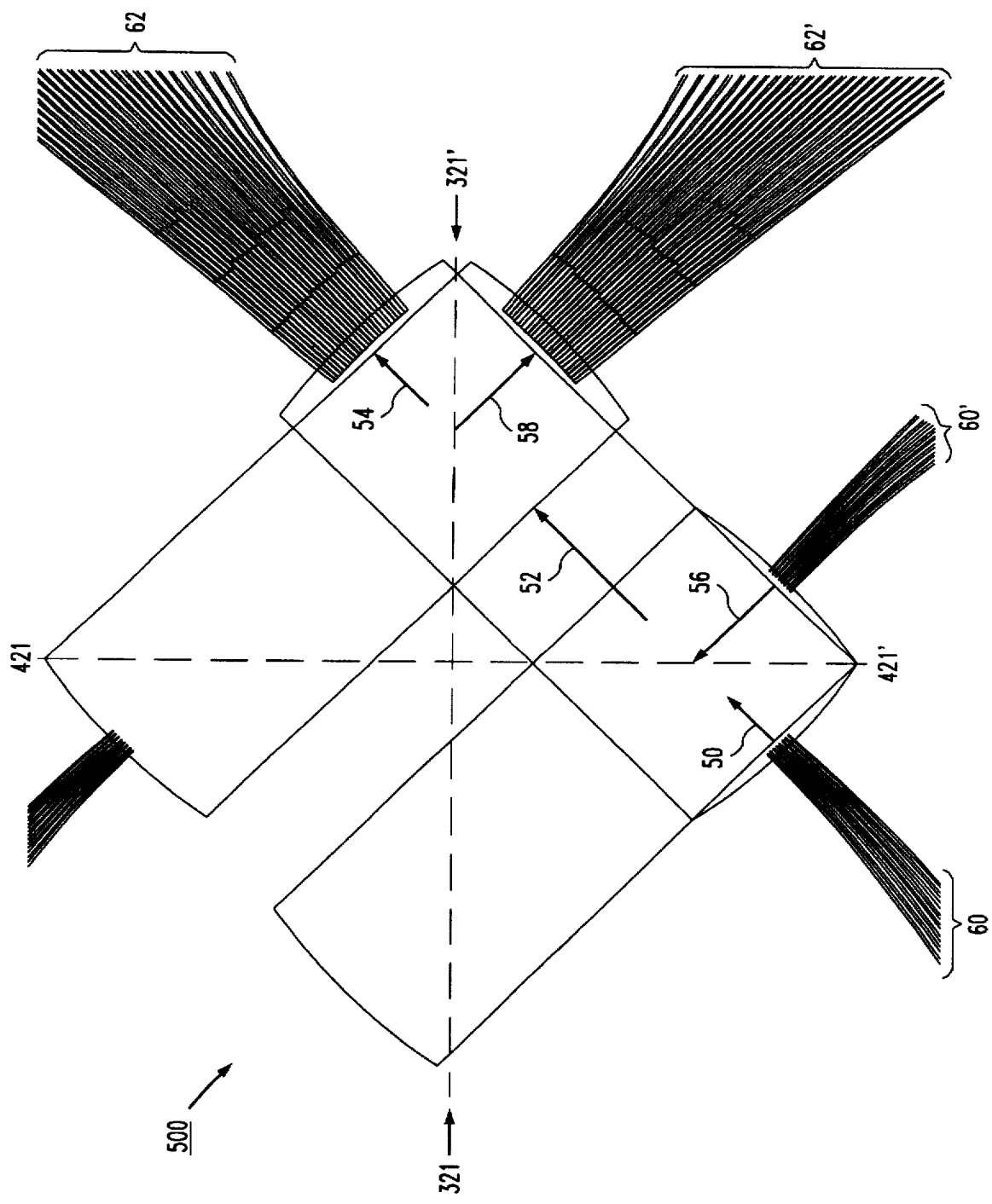
FIG. 5 is a schematic drawing of a waveguide grating, router constructed according to a fourth embodiment and employing first and second optically reflective planes.

FIG. 5 is a schematic drawing of a waveguide grating router constructed according to a fourth embodiment. This embodiment serves to illustrate the advantages of using first and second, optically reflective planes. Referring now to FIG. 5, a schematic drawing of a waveguide grating router 500 constructed according to a fourth embodiment is shown. Waveguide grating router 500 employs first and second optically reflective planes 321–321', 421–421', respectively. First plane 321–321' is positioned to be substantially perpendicular to second plane 421–421'. Although the embodiment of FIG. 5 employs first and second reflective planes 321–321', 421–421', these planes are shown for illustrative purposes. For example, the structure shown in FIG. 5 may be fabricated using only plane 421–421', and not plane 321–321'. Alternatively, this structure could be fabricated using only plane 321–321' and not plane 421–421'.

Assume, for analytical purposes, that neither the first plane 321–321' nor the second plane 421–421' are present in the waveguide grating router of FIG. 5. In this example, light incident at a first set of optical ports 60 traverses a path defined by arrows 50, 52, and 54, and second set of optical ports 62. If the first plane 321–321' is present but the second plane 421–421' is not used, light incident upon first set of optical ports 60 traverses a path defined by arrows 50, 52, and 58, and second set of optical ports 62'. By contrast, if the first plane 321–321' is not present but the second plane 421–421' is used, light incident upon first set of optical ports 60' traverses a path defined by arrows 56, 52, and 54, and second set of optical ports 62. Finally, if first plane 321–321' and second plane 421–421' are both present, light incident upon first set of optical ports 60' traverses a path defined by arrows 56, 52, and 58, and second set of optical ports 62'.

What is claimed is:

1. A compact waveguide grating router comprising first and second free space regions, first and second sets of optical ports, and a grating array, wherein the first and second sets of optical ports and the grating array are integrated onto a substrate, such that the grating array is coupled to the first free space region and the second free space region, the waveguide router characterized by:

(a) first plane, defining a first optically reflective surface, and positioned in the first free space region;

(b) a second plane, defining a second optically reflective surface, and positioned in the second free space region;

wherein the first plane is oriented such that incident optical signals from the first set of optical ports are reflected to the grating array, and the second plane is oriented such that incident optical signals from the grating array are reflected to the second set of optical ports.

2. A compact waveguide grating router comprising first and second free space regions, first and second sets of optical ports, and a grating array, wherein the first and second sets of optical ports and the grating array are integrated onto a substrate, such that the grating array is coupled to the first free space region and the second free space region, the waveguide router characterized by:

a first plane, defining a first optically reflective surface, and positioned in the first free space region; wherein the first plane is oriented such that incident optical signals from the first set of optical ports are reflected to the grating array.

3. A compact waveguide grating router comprising first and second free space regions, first and second sets of optical ports, and a grating array, wherein the first and second sets of optical ports and the grating array are integrated onto a substrate, such that the grating array is coupled to the first free space region and the second free space region, the waveguide router characterized by:

a first plane, defining a first optically reflective surface, and positioned in the second free space region;

wherein the first plane is oriented such that incident optical signals from the grating array are reflected to the second set of optical ports.

4. The waveguide grating router of claim 1 wherein the first and second planes are provided by cleaving, cutting, etching, and/or sawing.

5. The waveguide grating router of claim 2 wherein the first plane is provided by cleaving, cutting, etching, and/or sawing.

6. The waveguide grating router of claim 3 wherein the first plane is provided by cleaving, cutting, etching, and/or sawing.

7. The waveguide grating router of claim 1 further characterized by a third plane oriented in a direction such that the third plane passes through both the first free space region and the second free space region, and such that the third plane is substantially perpendicular to the first and second planes, and wherein the third plane defines an optically-reflective surface.

8. The waveguide grating router of claim 2 further characterized by a second plane oriented in a direction such that the second plane passes through both the first free space region and the second free space region, and such that the second plane is substantially perpendicular to the first plane, and wherein the second plane defines an optically-reflective surface.

9. The waveguide grating router of claim 3 further characterized by a second plane oriented in a direction such that the second plane passes through both the first free space region and the second free space region, and such that the second plane is substantially perpendicular to the first plane, and wherein the second plane defines an optically-reflective surface.

10. The waveguide grating router of claim 9 wherein the second plane is provided by cleaving, cutting, etching, and/or sawing.

11. A compact waveguide grating router comprising a first free space region, a first set of optical ports, and a grating array, the grating array being coupled to the first free space region, characterized by:

(a) a first plane defining a first reflective surface and oriented in the first free space region such that incident optical signals from the first set of optical ports are reflected to the grating array;

(b) a second plane defining a second optically reflective surface and oriented such that the second plane passes through the first free space region, and such that the second plane is substantially perpendicular to the first plane; and (c) a third plane defining a third optically reflective surface, and oriented across the waveguide grating in a direction substantially perpendicular to the direction in which optical energy propagates in the waveguide grating.

12. The waveguide grating router of claim 11 wherein the first, second, and third planes are provided by cleaving, cutting, etching, or sawing.

13. A method of fabricating a compact waveguide grating router including the steps of:
   (a) using a substrate to form a first free space region, a second free space region, a first set of optical ports, a second sets of optical ports, and a grating array, wherein the first and second sets of optical ports and the grating array are integrated onto a substrate, such that the grating array is coupled to the first free space region and the second free space region;
   (b) forming a first plane, defining a first optically reflective surface, and positioned in the first free space region;
   (c) forming a second plane, defining a second optically reflective surface, and positioned in the second free space region;
   wherein the first plane is oriented such that incident optical signals from the first set of optical ports are reflected to the grating array, and the second plane is oriented such that incident optical signals from the grating array are reflected to the second set of optical ports.

14. A method of fabricating a waveguide grating router as set forth in claim 11 wherein the steps of forming the first and second planes are performed by cleaving, cutting, etching, and/or sawing.

15. A method of fabricating a waveguide grating router as set forth in claim 13 further including a step of forming a third plane oriented in a direction such that the third plane passes through both the first free space region and the second free space region, and such that the third plane is substantially perpendicular to the first and second planes, and wherein the third plane defines an optically-reflective surface.

16. A method of fabricating a waveguide grating router as set forth in claim 15 wherein the third plane is provided by cleaving, cutting, etching, and/or sawing.

17. A method of fabricating a compact waveguide grating router comprising the steps of:
   (a) in a substrate, forming a first free space region, a first set of optical ports, and a grating array, the grating array being coupled to the first free space region;
   (a) forming a first plane defining a first reflective surface and oriented in the first free space region such that incident optical signals from the first set of optical ports are reflected to the grating array;
   (c) forming a second plane defining a second optically reflective surface and oriented such that the second plane passes through the first free space region, and such that the second plane is substantially perpendicular to the first plane; and
   (c) forming a third plane defining a third optically reflective surface, and oriented across the waveguide grating in a direction substantially perpendicular to the direction in which optical energy propagates in the waveguide grating.

18. A method of fabricating a waveguide grating router as set forth in claim 17 wherein the steps of forming the first, second, and third planes are performed by cleaving, cutting, etching, or sawing.

19. The waveguide grating router of claim 1, wherein said first and second planes are formed by coating a portion of said free space region with a reflective material.

20. The waveguide grating router of claim 2, wherein said first plane is formed by coating a portion of said free space region with a reflective material.

21. The waveguide grating router of claim 3, wherein said first plane is formed by coating a portion of said free space region with a reflective material.

22. The waveguide grating router of claim 1 further comprising N input ports and N output ports to form an N×N multiplexer/demultiplexer.

23. The waveguide grating router of claim 2 further comprising N input ports and N output ports to form an N×N multiplexer/demultiplexer.

24. The waveguide grating router of claim 3 further comprising N input ports and N output ports to form an N×N multiplexer/demultiplexer.

* * * * *